United States Patent
Lee et al.

(10) Patent No.: US 10,887,029 B2
(45) Date of Patent: Jan. 5, 2021

(54) METHOD AND APPARATUS FOR ANALYSING COMMUNICATION CHANNEL IN CONSIDERATION OF MATERIAL AND CONTOURS OF OBJECTS

(71) Applicant: Samsung Electronics Co., Ltd., Suwon-si (KR)

(72) Inventors: Soonyoung Lee, Seoul (KR); Sungbum Park, Seoul (KR); Sungrok Yoon, Seoul (KR); Minsung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/816,291

(22) Filed: Nov. 17, 2017

(65) Prior Publication Data

US 2018/0138996 A1    May 17, 2018

Related U.S. Application Data

(60) Provisional application No. 62/423,412, filed on Nov. 17, 2016.

(30) Foreign Application Priority Data

Dec. 8, 2016  (KR) .......................... 10-2016-0167140

(51) Int. Cl.
*H04B 17/345* (2015.01)
*G01N 21/00* (2006.01)
(Continued)

(52) U.S. Cl.
CPC .......... *H04B 17/345* (2015.01); *G01N 21/00* (2013.01); *G06K 9/00637* (2013.01);
(Continued)

(58) Field of Classification Search
CPC .... H04B 17/345; H04B 17/27; H04B 17/391; G06K 9/00637; G06K 9/4604;
(Continued)

(56) References Cited

U.S. PATENT DOCUMENTS

| 5,450,615 A | 9/1995 | Fortune et al. |
| 6,308,043 B1 | 10/2001 | Solheim et al. |

(Continued)

FOREIGN PATENT DOCUMENTS

| EP | 0664619 A1 | 7/1995 |
| EP | 2 615 862 A1 | 7/2013 |

(Continued)

OTHER PUBLICATIONS

Written Opinion of the International Searching Authority dated Feb. 23, 2018, issued in International Application No. PCT/KR2017/013115. (Year: 2018).*

(Continued)

*Primary Examiner* — Brenda C Bernardi
(74) *Attorney, Agent, or Firm* — Jefferson IP Law, LLP

(57) ABSTRACT

A signal transmission characteristic analysis method for use in a wireless communication system and an apparatus thereof are provided. The method includes locating transmission and reception positions, checking at least one object on a transmission path of a signal from the transmission position to the reception position and material of the at least one object, and determining the signal transmission characteristic based on information on the material of the at least one object. The present disclosure relates to a communication method and system for converging a 5th-Generation (5G) communication system for supporting higher data rates beyond a 4th-Generation (4G) system with a technology for Internet of Things (IoT). The present disclosure may be (Continued)

applied to intelligent services based on 5G communication technology and IoT-related technology.

20 Claims, 21 Drawing Sheets

(51) Int. Cl.
| | | |
|---|---|---|
| *G06K 9/46* | (2006.01) | |
| *H04B 17/27* | (2015.01) | |
| *H04B 17/391* | (2015.01) | |
| *G06K 9/00* | (2006.01) | |
| *G06K 9/62* | (2006.01) | |
| *G06T 15/06* | (2011.01) | |

(52) U.S. Cl.
CPC ......... *G06K 9/4604* (2013.01); *G06K 9/4628* (2013.01); *G06K 9/4661* (2013.01); *G06K 9/6202* (2013.01); *H04B 17/27* (2015.01); *H04B 17/391* (2015.01); *G06T 15/06* (2013.01)

(58) Field of Classification Search
CPC .. G06K 9/4661; G06K 9/6202; G06K 9/4628; G01N 21/00; G06T 15/06
See application file for complete search history.

(56) References Cited

U.S. PATENT DOCUMENTS

| | | |
|---|---|---|
| 7,995,117 B1 | 8/2011 | Bonn |
| 2002/0093538 A1 | 7/2002 | Carlin |
| 2004/0127224 A1 | 7/2004 | Furukawa et al. |
| 2004/0236547 A1 | 11/2004 | Rappaport et al. |
| 2004/0259554 A1 | 12/2004 | Rappaport et al. |
| 2005/0091958 A1 | 5/2005 | Zehavi et al. |
| 2006/0019679 A1 | 1/2006 | Rappaport et al. |
| 2006/0244830 A1 | 11/2006 | Davenport et al. |
| 2008/0161005 A1 | 7/2008 | Sato et al. |
| 2008/0229234 A1 | 9/2008 | Astolfi et al. |
| 2008/0297505 A1 | 12/2008 | Elsberg et al. |
| 2010/0197239 A1 | 8/2010 | Catovic et al. |
| 2010/0250221 A1 | 9/2010 | Kim et al. |
| 2011/0093194 A1 | 4/2011 | Paik et al. |
| 2011/0122997 A1 | 5/2011 | Lu et al. |
| 2011/0222372 A1 | 9/2011 | O'Donovan et al. |
| 2011/0263277 A1 | 10/2011 | Gallegos |
| 2011/0281526 A1 | 11/2011 | Matsuda et al. |
| 2011/0287801 A1 | 11/2011 | Levin et al. |
| 2012/0087270 A1 | 4/2012 | Wan et al. |
| 2012/0113095 A1 | 5/2012 | Hwang et al. |
| 2012/0293356 A1 | 11/2012 | Barthel et al. |
| 2012/0313946 A1 | 12/2012 | Nakamura et al. |
| 2013/0185024 A1 | 7/2013 | Mahasenan et al. |
| 2013/0278465 A1* | 10/2013 | Owen .................. G01S 1/02 342/458 |
| 2014/0004885 A1 | 1/2014 | Demaine |
| 2015/0293215 A1 | 10/2015 | Kim et al. |
| 2015/0294511 A1 | 10/2015 | Nishioka et al. |
| 2016/0007426 A1 | 1/2016 | Ashdown et al. |
| 2016/0013822 A1 | 1/2016 | Polehn et al. |
| 2016/0330643 A1 | 11/2016 | Sahin et al. |
| 2017/0100092 A1 | 4/2017 | Kruse et al. |
| 2017/0201976 A1 | 7/2017 | Yue et al. |
| 2017/0277953 A1 | 9/2017 | Stanley |
| 2017/0277979 A1 | 9/2017 | Allen et al. |
| 2017/0338901 A1 | 11/2017 | Zhihua et al. |
| 2018/0075746 A1 | 3/2018 | Jiang et al. |
| 2018/0138996 A1 | 5/2018 | Lee et al. |
| 2019/0036598 A1* | 1/2019 | Smyth ................. H04W 52/242 |

FOREIGN PATENT DOCUMENTS

| | | |
|---|---|---|
| GB | 2530104 A | 3/2016 |
| KR | 10-2007-0010318 A | 1/2007 |
| KR | 10-2007-0034205 A | 3/2007 |
| KR | 10-2008-0105369 A | 12/2008 |
| KR | 10-2011-0019117 A | 2/2011 |
| WO | 2016/067017 A1 | 5/2016 |

OTHER PUBLICATIONS

J. H. Tarng, "Effective Models in Evaluating Radio Coverage on Single Floors of Multifloor Buildings", May 1999, IEEE Transactions on Vehicular Technology, vol. 48, No. 3, p. 782-789. (Year: 1999).*
International Search Report dated Aug. 11, 2017, issued in International Application No. PCT/KR2017/002692.
U.S. Office Action dated Aug. 8, 2018, issued in U.S. Appl. No. 15/816,340.
Zhenliang Zhang et al., 'Coverage and channel characteristics of millimeter wave band using ray tracing', 2015 IEEE International Conference on Communications(ICC), pp. 1380-1385, Sep. 10, 2015, See Sections II-III.
Vittorio Degli-Esposti et al,, 'Ray-Tracing-Based mm-Wave Beamforming Assessment', IEEE Access (vol. 2), pp. 1314-1325, Oct. 31, 2014, See Section II.
U.S. Final Office Action dated Feb. 28, 2019, issued in U.S. Appl. No. 15/816,340.
Ji et al.; Adriadne; A Dynamic Indoor Signal Map Construction and Localization System; The 4th International Conference on Mobile Systems, Applications and Services; Mobisys 2006; Jun. 19-22, 2006; Uppsala, Sweden.
El-Kafrawy et al.; Propagation Modeling for Accurate Indoor WLAN RSS-Based Localization; Vehicular Technology Conference Fall (VTC 2010—Fall); 2010 IEEE 72nd; IEEE; 2010; Piscataway, NJ.
European Search Report dated Jul. 25, 2019; European Appln. No. 17872533.9-1219 / 3497827 PCT/KR2017013115.
European Partial Search Report dated Jul. 25, 2019; European Appln. No. 17872534.7-1219 / 3494655 PCT/KR2017013123.
European Search Report dated Jul. 25, 2019; European Appln. No. 17872267.4-1219 / 3509231 PCT/KR2017002692.
Zhengqing Yun et al., "Radio propagation modeling in complex environments for wireless communications", Microwaves, Communications, Antennas and Electronics Systems, 2009. COMCAS 2009. IEEE International Conference on, IEEE, Piscataway, NJ, USA, Nov. 9, 2009, pp. 1-4, XP031614693.
Extended European Search Report dated Nov. 7, 2019, issued in European Patent Application No. 17872534.7.
U.S. Non-final Office Action dated Jan. 6, 2020, issued in U.S. Appl. No. 15/816,340.
U.S. Non-final Office Action dated Jul. 20, 2020, issued in U.S. Appl. No. 16/349,475.

* cited by examiner

METHOD AND APPARATUS FOR ANALYSING COMMUNICATION CHANNEL IN CONSIDERATION OF MATERIAL AND CONTOURS OF OBJECTS

CROSS-REFERENCE TO RELATED APPLICATION(S)

This application claims the benefit under 35 U.S.C. § 119(e) of a U.S. Provisional application filed on Nov. 17, 2016, in the U.S. Patent and Trademark Office and assigned Ser. No. 62/423,412, and under 35 U.S.C. § 119(a) of a Korean patent application filed on Dec. 8, 2016, in the Korean Intellectual Property Office and assigned Serial number 10-2016-0167140, the entire disclosure of each of which is hereby incorporated by reference.

TECHNICAL FIELD

The present disclosure relates to a communication channel analysis method and apparatus for use in a communication system. More particularly, the present disclosure relates to a ray tracing simulation-based communication channel environment analysis method and apparatus.

BACKGROUND

To meet the increased demand for wireless data traffic since the deployment of 4th-Generation (4G) communication systems, efforts have been made to develop an improved 5th-Generation (5G) or pre-5G communication system. Therefore, the 5G or pre-5G communication system is also called a "Beyond 4G Network" or a "Post long-term evolution (LTE) System". Implementation of the 5G communication system in higher frequency (mmWave) bands, e.g., 60 GHz bands, is being considered so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large-scale antenna techniques are being discussed for the 5G communication system. In addition, in the 5G communication system, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM) and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "Security technology" have been demanded for IoT implementation, research has been conducted recently on a sensor network, machine-to-machine (M2M) communication, machine type communication (MTC), and so forth. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services through convergence and combination between existing information technology (IT) and various industrial applications.

In line with this, various attempts have been made to apply the 5G communication system to IoT networks. For example, technologies such as a sensor network, MTC, and M2M communication may be implemented by beamforming, MIMO, and array antennas. Application of a cloud RAN as the above-described Big Data processing technology may also be considered as an example of convergence between the 5G technology and the IoT technology.

Meanwhile, there is a need of an enhanced channel environment estimation and network planning method for implementing a 5G communication system. Network planning addresses all the activities of locating positions of transmitters (Tx) for transmitting radio frequency (RF) signals to provide wireless communication services in specific areas, collecting information on RF signals at the locations of receivers (Rx), analyzing a channel environment using mathematical modelling techniques or a ray tracing simulation result, and determining the best Tx location based thereon. The channel environment analysis is performed with various types of RF signal information (e.g., pathloss and coverage) as an important part of network planning. In the present disclosure, the mathematical modeling techniques may include empirical modeling techniques.

The mathematical modeling technique make it possible to predict RF information with a function expressed explicitly through a predetermined signal transmission/reception modeling technique using inputs such as Tx signal frequency and distance. In the drawing, each of the transmitters (Tx) 110 and 120 forms three beams different in direction so as to transmit Tx signals with different RF characteristics using the modeling technique. The mathematical modeling technique is advantageous in terms of making it possible to predict RF information with a small computation amount, but it has a drawback of reduction of modeling accuracy on a high frequency RF signal.

In this respect, application of a ray tracing simulation-based simulation technique may be considered for channel characteristic analysis on a high frequency RF signal; this makes it possible to analyze a channel environment in consideration of potential RF signal propagation paths. However, the ray-tracing based simulation technique is likely to increase the computation amount and lack of accuracy; thus, there is a need of a method for reflecting a real environment to the simulation to overcome these problems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a ray tracing simulation-based radio frequency (RF) channel environment analysis method and apparatus capable of improving analysis accuracy, reflecting the real environment better, and reducing computation amount.

Also, the present disclosure aims to provide a ray tracing simulation-based RF channel environment analysis method and apparatus capable of improving the accuracy of a simulation result by reflecting information on the surface material and contours of objects on signal propagation paths.

In accordance with an aspect of the present disclosure, a signal propagation characteristic analysis method of a wireless communication system is provided. The signal propagation characteristic analysis method includes locating transmission and reception positions, checking at least one object on a propagation path of a signal from the transmission position to the reception position and material of the at least one object, and determining the signal propagation characteristic based on information on the material of the at least one object.

In accordance with another aspect of the present disclosure, an arithmetic device for analyzing signal propagation characteristic is provided for use in a wireless communication system. The arithmetic device includes an input device which transmits and receives information and at least one processor which locates transmission and reception positions, checks at least one object on a propagation path of a signal from the transmission position to the reception position and material of the at least one object, and determines the signal propagation characteristic based on information on the material of the at least one object.

In accordance with another aspect of the present disclosure, a non-transitory non-volatile computer-readable storage medium is provided. The storage medium stores at least one program comprising commands, which when executed by a computer, performs the method of locating transmission and reception positions, checking at least one object on a propagation path of a signal from the transmission position to the reception position and material of the at least one object, and determining the signal propagation characteristic based on information on the material of the at least one object.

In accordance with another aspect of the present disclosure, a network planning method is provided for use in a wireless communication system. The network planning method includes checking at least one object on a propagation path of a signal from a transmission position to a reception position, identifying material of the at least one object, and determining the signal propagation characteristic based on the material of the at least one object.

In accordance with still another aspect of the present disclosure, an arithmetic device for network planning in a wireless communication system is provided. The arithmetic device includes an input device which transmits and receives information and at least one processor which checks at least one object on a propagation path of a signal from a transmission position to a reception position, identifies material of the at least one object, and determines the signal propagation characteristic based on the material of the at least one object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
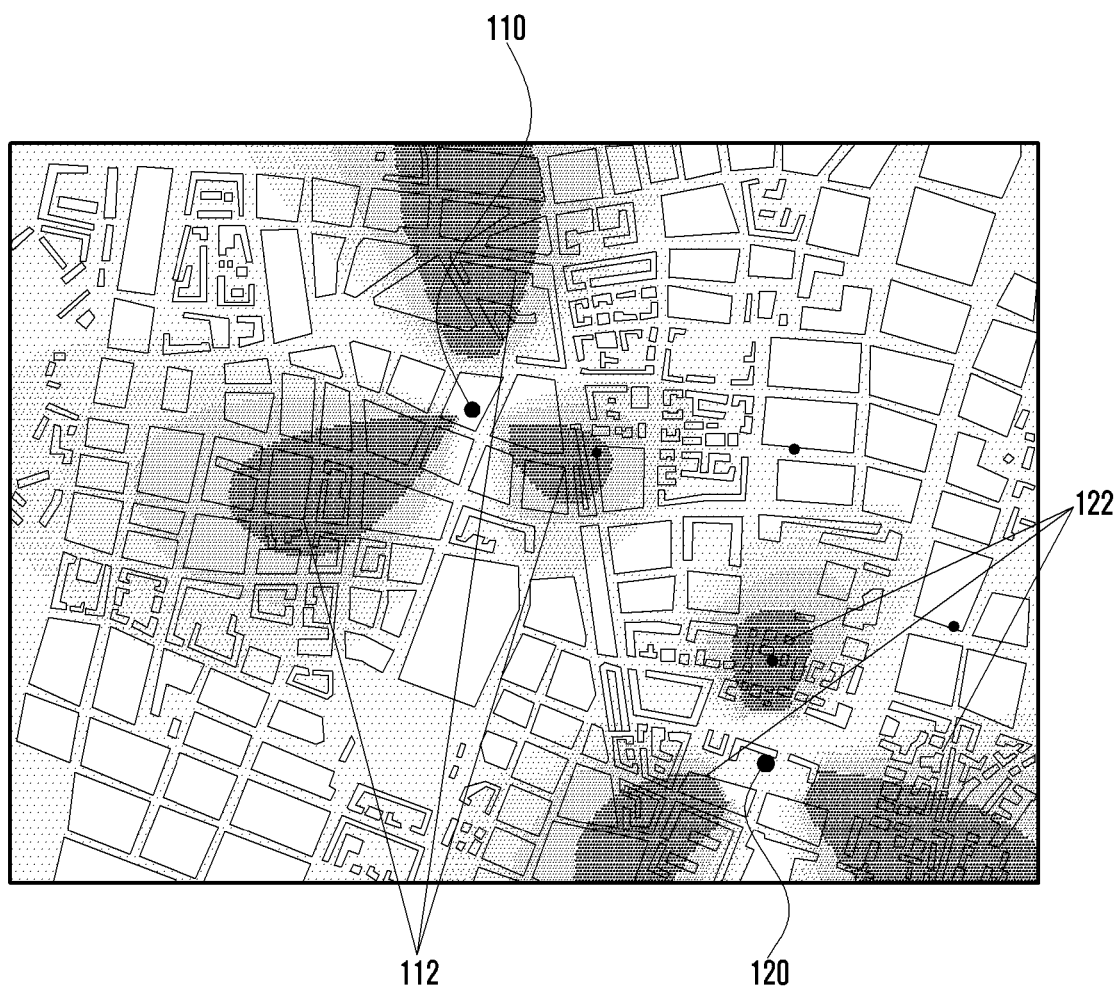
FIG. 1 is a diagram for explaining a network planning method using a mathematical modeling technique according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of technical specifications well-known in the art and unrelated directly to the present disclosure may be omitted to avoid obscuring the subject matter of the present disclosure. This aims to omit unnecessary description so as to make clear the subject matter of the present disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

Although depicted in a particular order in the drawings, two successive operations may be performed in reverse order or in parallel. It is obvious that an operation may be performed optionally unless expressly stated as essential.

FIG. 1 is a diagram for explaining a network planning method using a mathematical modeling technique according to an embodiment of the present disclosure.

Referring to FIG. 1, transmitters (Tx) 110 and 120 may form Tx beams 112 and 122 to transmit signals.

Figure 2:
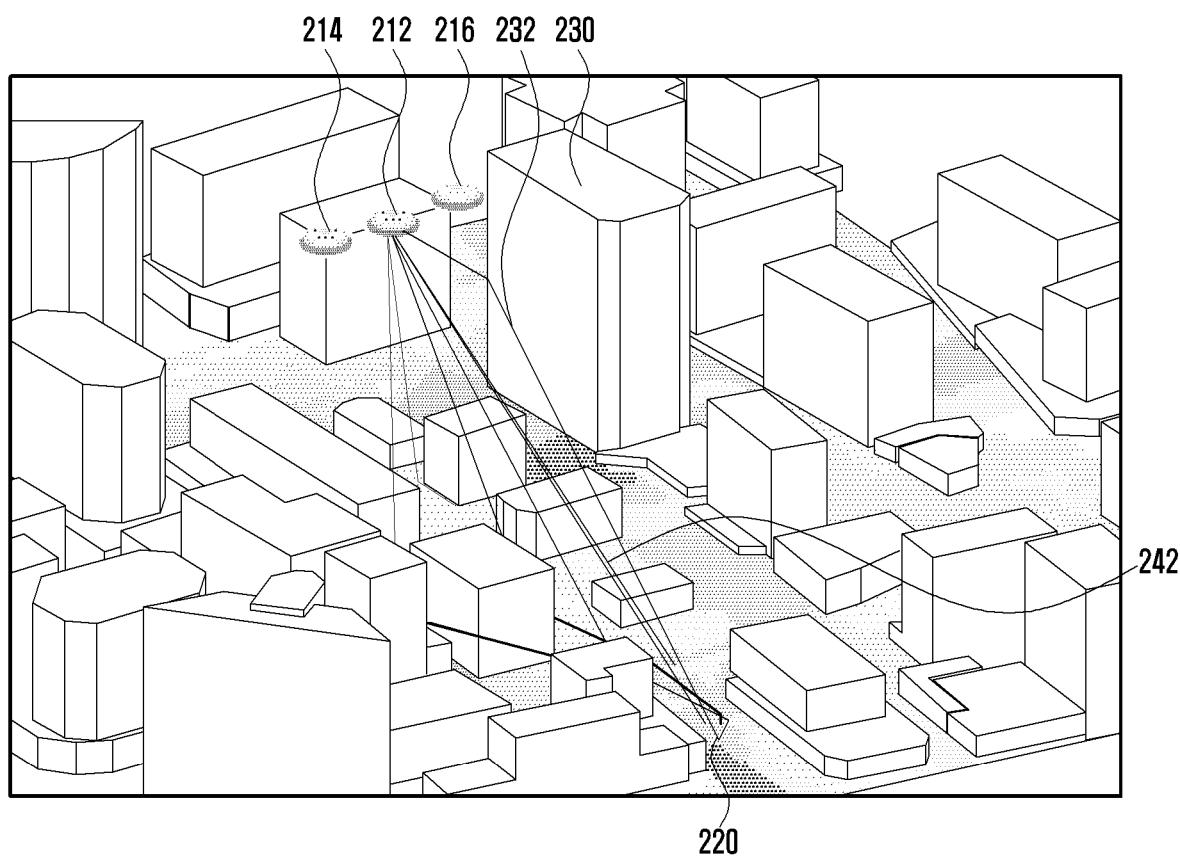
FIG. 2 is a diagram for explaining a ray tracing simulation method according to an embodiment of the present disclosure.

FIG. 2 is a diagram for explaining a ray tracing simulation method according to an embodiment of the present disclosure.

Under the assumption that one or more transmitters (Tx) 212, 214, and 216 transmit signals, FIG. 2 depicts the received signal strength level by the use of shading on a map. As the received signal strength level increases, the shading grows darker.

On the assumption that a receiver is located at a position 220, the received signal strength may be measured in an area centered therearound. It may also be possible to determine a transmission channel per potential propagation path between one transmitter 212 and the receiver located at the position 220. The signal transmitted by the transmitter 212 may propagate to the receiver directly as denoted by reference number 242 or after being reflected by an object 230 as denoted by reference number 232. By performing a ray tracing simulation, it is possible to acquire and collect the information on the received signal strength and propagation paths of the signals transmitted by the Tx 212, 214, and 216 located in a certain area. In order to acquire more accurate information on the received signal, it may be necessary to consider at least one of the surface material and contours of the objects reflecting the signal in measuring the received signal strengths of the signal propagated over the respective propagation paths. Although mentioned as surface material, this term is intended to convey the concept indicating internal material of an object which affects reflection of a radio wave as well as the surface of the object so as to make it possible to estimate more accurately the radio wave reflection characteristics.

An obstacle that the radio wave can penetrate may be placed on the direct propagation path of the signal. Such an obstacle may be a tree or the like that is penetrable by the radio wave and attenuates the signal so as to be considered for ray tracing simulation. By taking the information on the penetrable obstacle into consideration, it is possible to improve the accuracy of the simulation result. Although the tree serves as an example of a penetrable obstacle that attenuates signals on the direct propagation path, the term "penetrable obstacle" is intended to include other plants and objects that may attenuate signals on the direct propagation path.

Through the ray tracing simulation, it may be possible to locate the best position of at least one of the transmitter and the receiver. According to an embodiment of the present disclosure, the ray tracing simulation may be performed in consideration of a plurality of candidate positions to determine the position of at least one of the transmitter and receiver based on the ray tracing simulation result.

As described above, the ray tracing simulation technique is capable of estimating transmission channels corresponding to the radio frequency (RF) signal propagation paths and predicting RF signal characteristics at the position 220 of the receiver based on the estimation result. According to an embodiment of the present disclosure, the ray tracing simulation-based channel environment analysis method is capable of acquiring more accurate RF signal information by performing the ray tracing simulation in consideration of at least one of a signal propagation path environment (e.g., kind of medium), 3-dimensional (3D) topography, and reflection and diffraction of buildings. Also, the ray tracing simulation-based channel estimation method is capable of being performed by reflecting the real environment precisely without any limit in frequency for RF signals and of determining at least one of the best transmission and reception points based on the simulation result.

Meanwhile, a 5th-Generation (5G) network is expected to operate on a frequency in the ultra-high frequency band of 28-60 GHz. Accordingly, it is preferable to use a ray tracing simulation technique rather than a mathematical modeling technique as a part of a 5G network planning tool to acquire radio signal information. When predicting propagation paths produced by reflection on building walls using a ray tracing simulation technique, the reflection intensity may be calculated under the assumption that the surfaces of all buildings have the same RF characteristics. However, such an assumption makes it difficult to guarantee the reliability of the simulation result because the reflexibility of an RF signal varies according to the reflection surface material and pattern and contours of the object; accordingly, there is a need of an enhanced ray tracing technique in consideration of the aforementioned information items.

Figure 3A:
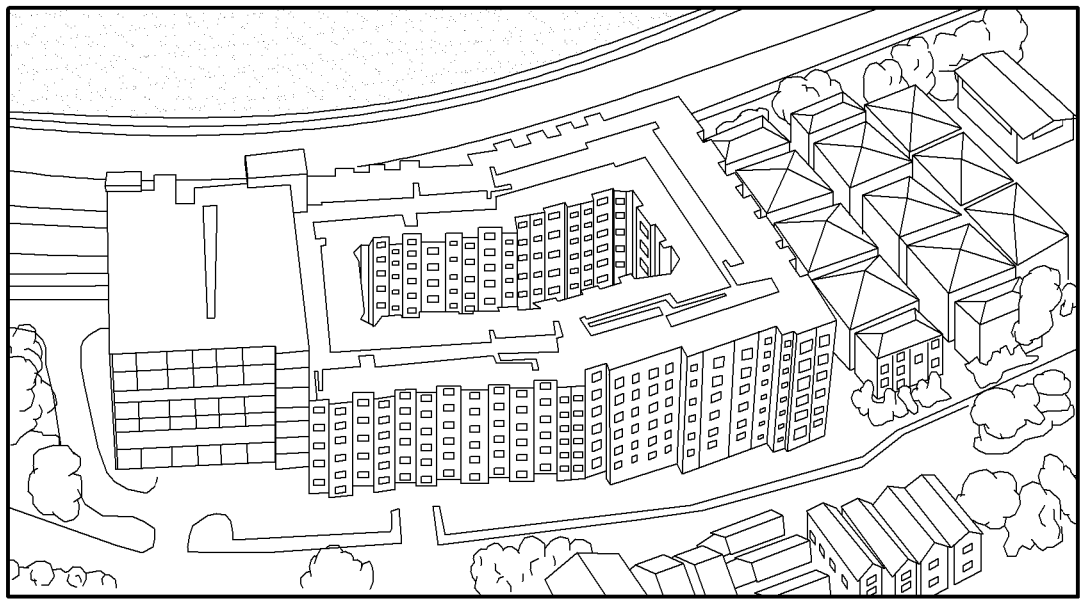
FIGS. 3A and 3B are diagrams for explaining a method for acquiring three-dimensional (3D) map information according to various embodiments of the present disclosure.
Figure 3B:
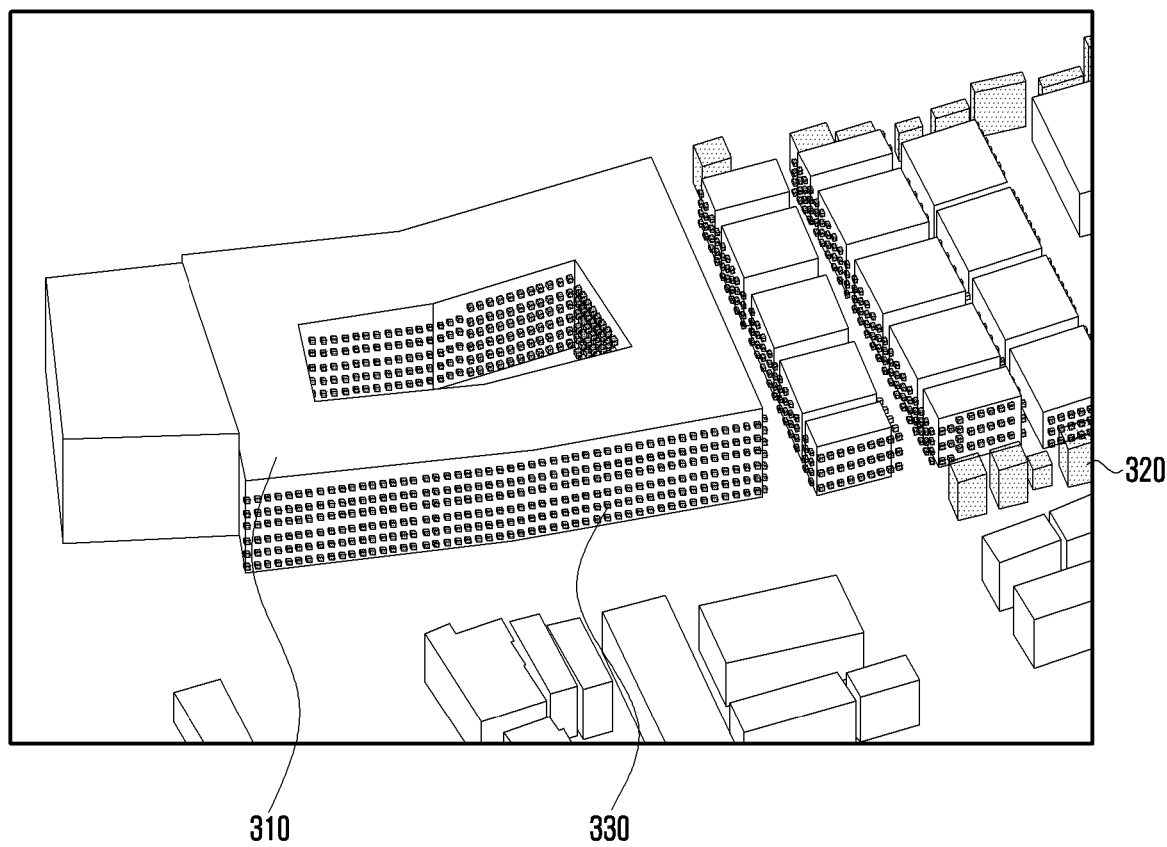

FIGS. 3A and 3B are diagrams for explaining a method for acquiring 3D map information according to an embodiment of the present disclosure.

Referring to FIGS. 3A and 3B, it may be possible to acquire the 3D map information based on the real image information of FIG. 3A and location information corresponding to the image information. In detail, it may be possible to acquire the 3D map information of FIG. 3B for use in a ray tracing simulation based on the image information.

The map information of FIG. 3B may include buildings 310, candidate receiver positions 330, and trees 320. Using the acquired map information, it may be possible to locate candidate transmitter and receiver positions and determine the position of at least one of the transmitters and receivers by performing the ray tracing simulation with the candidate positions.

According to an embodiment of the present disclosure, it is possible to acquire a more accurate simulation result by performing the ray tracing simulation in consideration of surface materials and contours of the objects such as the buildings 310 that affect the reflection and diffraction of the radio wave.

According to an embodiment of the present disclosure, an object such as the trees 320 allows penetration of the radio wave but attenuates the signal more significantly than the air. The present disclosure makes it possible to acquire a more accurate simulation result by performing the ray tracing simulation in consideration of the object-penetrated wave propagation characteristics.

According to an embodiment of the present disclosure, the ray trancing simulation may be selectively performed with the candidate positions 330, which include positions for locating a mobile or fixed receiver. In detail, it may be possible to install a receiver around a window of a building 310 to act as a relay between another receiver inside the building and still another receiver outside the building. It may also be possible to acquire a result value in a good signal reception environment by performing the ray tracing simulation in consideration of the candidate receiver positions 330.

Figure 4A:
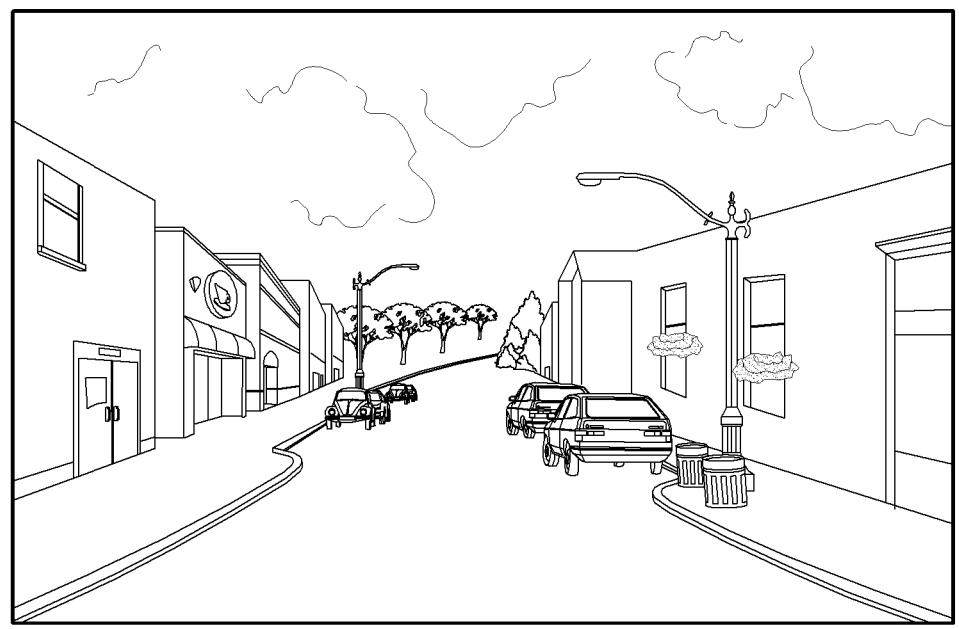
FIGS. 4A and 4B are diagrams for explaining a method for acquiring material information of objects in an image according to various embodiments of the present disclosure.
Figure 4B:
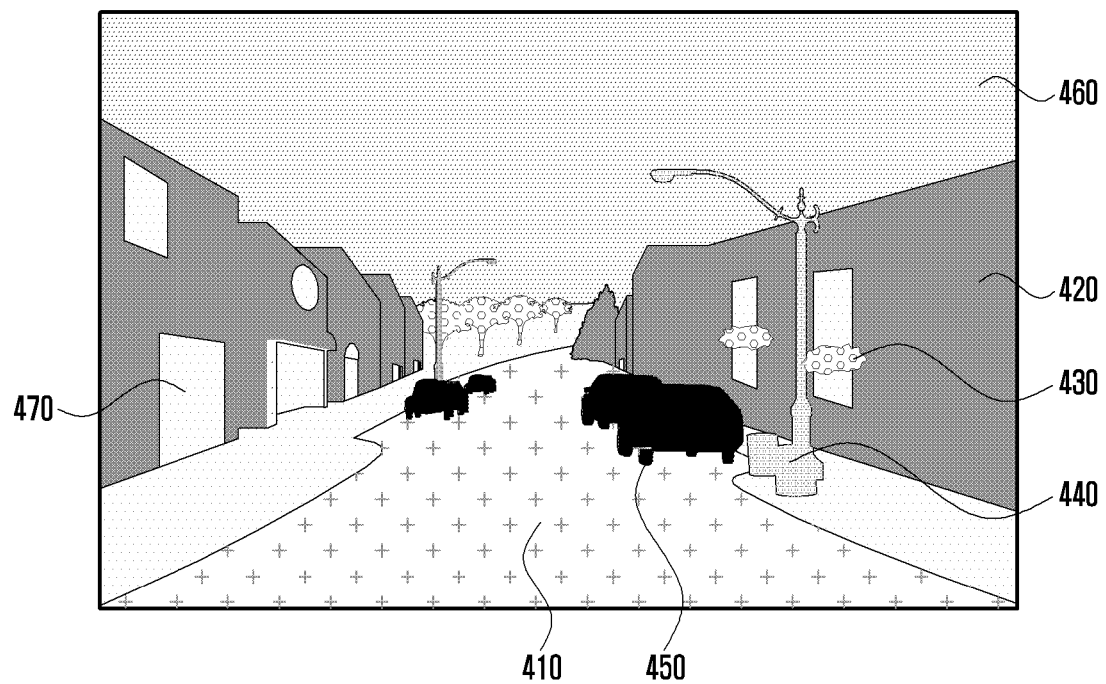

FIGS. 4A and 4B are diagrams for explaining a method for acquiring material information of objects in an image according to an embodiment of the present disclosure.

Referring to FIGS. 4A and 4B, it may be possible to determine the material of an object in the image. In detail, it may be possible to determine the material of the object in the image using a deep learning-based computer vision technology. The deep learning-based computer vision technology is described later in more detail.

According to an embodiment of the present disclosure, it may be possible to analyze the image as shown in FIG. 4A to acquire the analysis result as shown in FIG. 4B. It may be possible to identify individual elements in the image based on at least one of color, light and darkness, reflectivity, relative location relationship among elements, and arrangement of elements in the image. According to an embodiment of the present disclosure, it may be possible to identify material objects such as asphalt 410, concrete 420, plants 430, steel structure 440, vehicle 450, sky 460, and glass 470 through an image analysis process. As described above, it is possible to determine the materials of the objects arranged in the image based on image information and acquire a more accurate simulation result by reflecting the characteristics of the materials to the ray tracing simulation.

Figure 5:
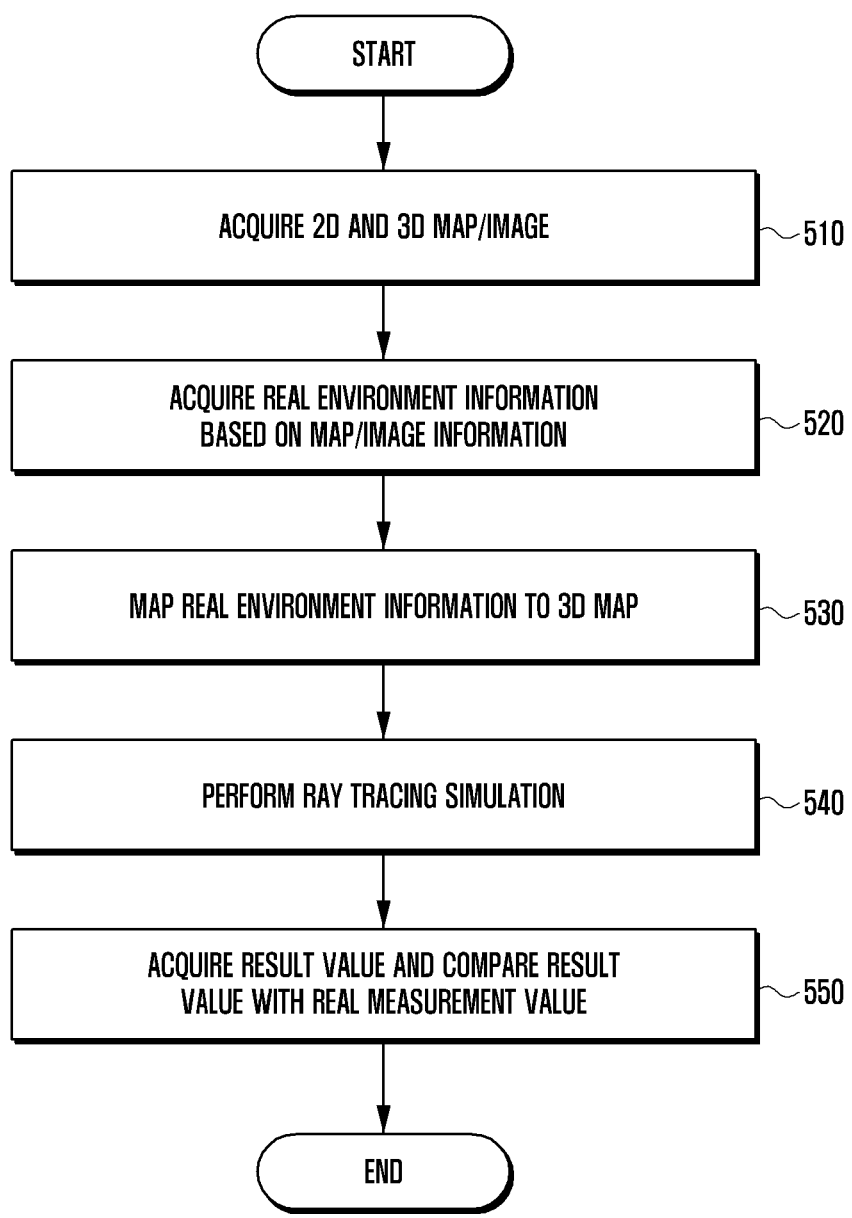
FIG. 5 is a flowchart illustrating a ray tracing-based communication channel environment analysis method according to an embodiment of the present disclosure.

FIG. 5 is a flowchart illustrating a ray tracing-based communication channel environment analysis method according to an embodiment of the present disclosure.

Referring to FIG. 5 depicts a method for performing a ray tracing simulation. According to an embodiment of the present disclosure, the ray tracing simulation may be performed by an arithmetic device with a controller (e.g., at least one processor). The arithmetic device may include a central processing unit and may be a personal computer or a workstation. According to an embodiment of the present disclosure, it may be expressed that the simulation is performed by the arithmetic device.

The arithmetic device may acquire a 2-dimensional (2D) image and a 3D map at operation 510. According to an embodiment of the present disclosure, the 2D image may include supplementary information thereof, and the supplementary information may include shooting information including shooting location, shooting direction, and shooting angle. It may be possible to produce a 3D map corresponding to the 2D image based on the supplementary information. The 3D map may include location information and 3D object information corresponding to the location information. The 3D object information may include the information on the contours of buildings, structures, and plants on the land and/or water surface; according to an embodiment of the present disclosure, the 3D object information may also include the information on at least one of candidate transmitter and receiver positions.

The arithmetic device may acquire real environment information based on at least one of the map information and the image information at operation 520. The real environment information may include objects on a communication path and characteristics of the objects. In detail, it may be possible to acquire information on the characteristics of the potential objects on the communication path by analyzing the 2D image. The characteristics of an object may include at least one of the surface material and contours of the object and, if a radio wave can penetrate the object, even the shape of the object and signal attenuation degree when the electronic wave penetrates the object.

At operation 530, the arithmetic device may map the real environment information of the communication path to the 3D map based on the information acquired at operations 510 and 520. It may also be possible to map the supplementary information acquired from the 2D image to the objects in the 3D map based on the supplementary information included in the 2D image information when mapping the acquired information to the 3D map.

At operation 540, the arithmetic device may perform the ray tracing simulation based on the information generated at operation 530. According to an embodiment of the present disclosure, the ray tracing simulation may be performed by sweeping a beam formed in a certain direction by changing the beam information in sequence or under the assumption that the transmitter transmits beams covering all directions during the same time period. It may be possible to predict and analyze the received signal quality at the position of a receiver by reflecting the propagation paths of the signal transmitted from a transmitter to the receiver and the real environment information on the propagation paths that are acquired as the result of the ray tracing simulation. According to an embodiment of the present disclosure, it may be possible to determine at least one of a transmitter's position and a receiver's position based on the 3D map and estimate the signal transmission environment based on the mapping information generated at operation 530 through the ray tracing simulation.

At operation 550, it may be possible to acquire the result value of the ray tracing simulation and then perform the ray tracing simulation again based on the acquired result value and a value acquired by performing measurement in the real environment. In detail, if a result of a comparison shows that the simulation result value and the real environment measurement value are different from each other, it may be possible to change the information acquired at operation 520 based on the real environment measurement value to generate a new simulation result value. By performing the ray tracing simulation by reflecting the real environment information to the 3D map, it is possible to improve the reliability of the communication channel analysis. In detail, it may be possible to install the transmitter and the receiver actually at the positions as targets of the ray tracing simulation to add or update the basic information for performing the ray tracing simulation based on the value acquired when the receiver receives the signal transmitted by the transmitter.

As described above, it may be possible to determine the best position of at least one of the transmitter and receiver for providing radio communication service in a certain area on the map based on the ray tracing result. It may be possible to perform network planning efficiently by determining the best position of at least one of the transmitter and receiver as above. That is, it may be possible to determine the best position of a base station for providing terminals with the radio communication service effectively in a certain area. By determining the best positions of base stations, it may become possible to provide terminals with communication services effectively with the installation of as small a number of base stations as possible.

It may also be possible to manage the network adaptively by reflecting the information on the received signal strength in the real environment. In detail, if the ambient environment is changed after installing a transmitter, it may be possible to perform additional ray tracing simulation in consideration of the changed environment and perform network management by adjusting the position of the transmitter by reflecting the ray tracing simulation result. The network management may further include changing the information on the beam formed by the transmitter in addition to adjusting the position of the transmitter. In detail, the transmitter may determine the Tx beam and Rx beam based on the ray tracing simulation result value. In order to determine the Tx and Rx beams, it may be possible to perform a beam arrangement based on the ray tracing simulation result value. Such an adaptive network management may be performed periodically.

Figure 6:
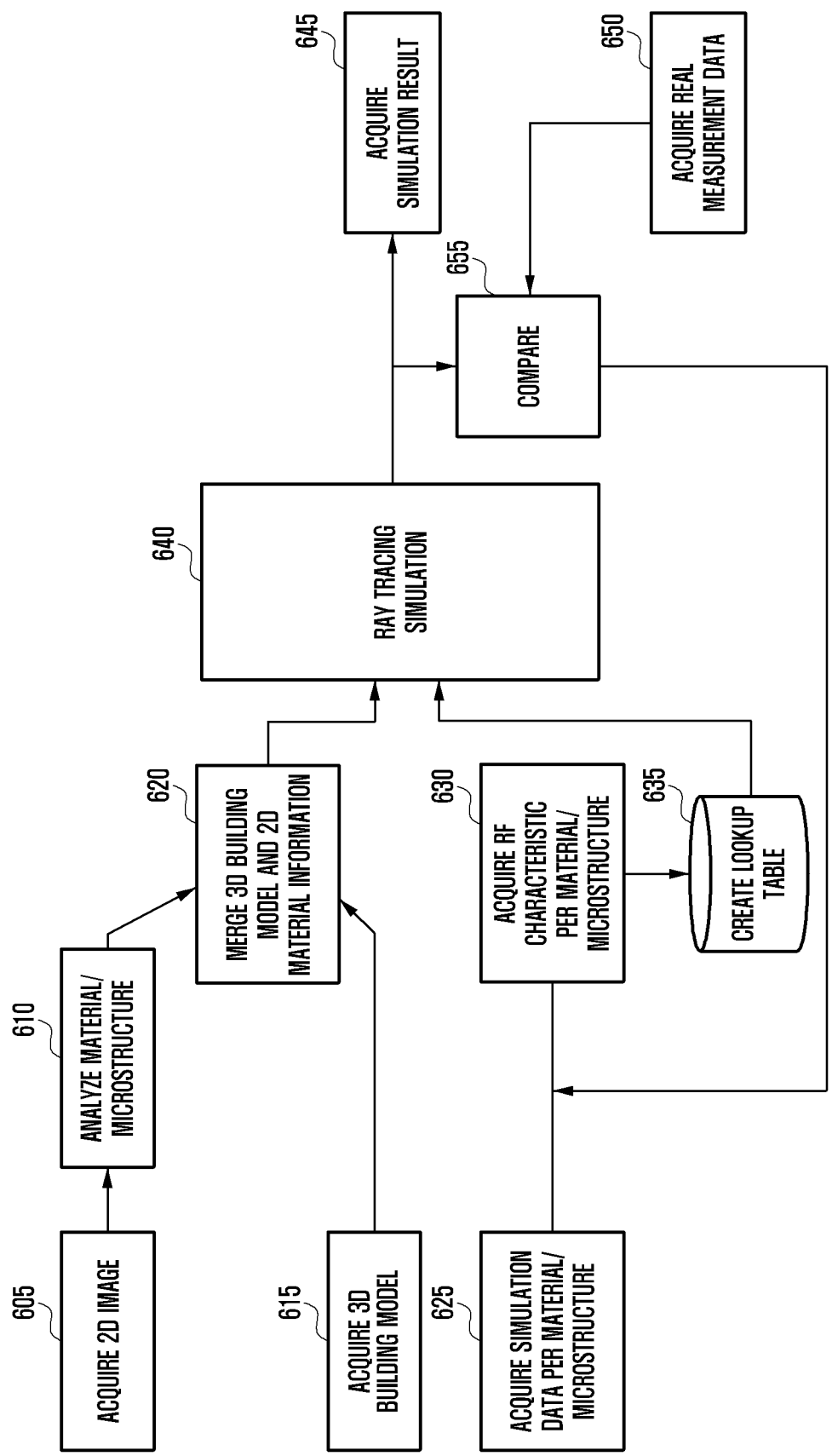
FIG. 6 is a diagram illustrating a method for performing a ray tracing simulation in consideration of the surface material and contours of objects according to an embodiment of the present disclosure.

FIG. 6 is a diagram illustrating a method for performing a ray tracing simulation in consideration of the surface material and contours of objects according to an embodiment of the present disclosure.

Referring to FIG. 6, an arithmetic device may perform the ray tracing simulation based on acquired information.

The arithmetic device may acquire a 2D image at operation 605. According to an embodiment of the present disclosure, the 2D image may be a picture with a building, which has been taken by a camera and which is provided with the information on the camera used for taking the image, i.e., shooting information including shooting location, shooting direction, and shooting zoom level. According to an embodiment of the present disclosure, the image may be a picture called street view or road view in various map services. The image may also be a picture taken at a certain spot in a certain direction. The image may also be a motion picture.

The arithmetic device may analyze the surface material and contours of an object located on the communication path based on the acquired 2D image at operation 610. In detail, the arithmetic device may detect the object located on the communication path in the acquired 2D image based on preconfigured or learned information and identify the surface material and contours of the object. The learned information may be acquired using deep learning-based computer vision technology. The analyzed information may be provided in a format corresponding to the information determined at a position acquired based on the supplementary information included in the 2D image. In detail, the arithmetic device acquires the information on multiple sample images and the materials of objects included in the sample images, extracts common characteristics of the images and materials based on the acquired information, and determines the material of the object included in an image to be input afterward based on the extracted common characteristics.

The arithmetic device may acquire 3D map model information at operation 615. The map model information may include information on the buildings and plants that can be located on the communication path. According to an embodiment of the present disclosure, the 3D map model may be implemented with polygon contours with corresponding heights at real longitude and latitude coordinates of buildings and may include information for matching the polygons with the building on the map. The arithmetic device may determine the sizes and locations of objects such as buildings that may be placed on the communication path based on the 3D map model information.

At operation 620, the arithmetic device may map the information acquired at operation 610 to the 3D map information acquired at operation 615. In detail, the information acquired at operation 610 may include at least one of location information, direction information, and shooting information corresponding to the surface material and microstructure information, and the 3D map information may include location information too; thus, it may be possible to map the information acquired at operation 610 to the map acquired at operation 615. Through this mapping process, it may be possible to reflect the real communication environment to the 3D map model.

At operation 625, the arithmetic device may acquire experiment data on the surface material and contours. Such data may be acquired by receiving previously measured data values or performing measurement autonomously.

At operation 630, the arithmetic device may acquire radio wave characteristics per surface material or contours based on the acquired information. In detail, it may be possible to acquire the radio wave characteristic information per kind of material of the object that may be placed on the communication path. According to an embodiment of the present disclosure, if the signal transmitted by a transmitter is received over a propagation path reflected by an object, the reflection characteristic of the radio wave may be changed according to the surface material and/or the contours of the object. If the signal with a certain incidence angle to the surface material or contours is reflected on the surface, it may be possible to determine the attenuation rate based thereon. It may also be possible to acquire the information on the permittivity, transmittivity, diffraction coefficient, and reflectivity per surface material or contour; this information can be used to determine the attenuation degree of a signal reflected on an object with the corresponding surface material or contours.

At operation 635, the arithmetic device may create a lookup table based on the information acquired at operation 630. The lookup table may categorize the surface materials with similar characteristics into the same category so as to reduce the computation amount of simulation by applying the per-category propagation characteristic in the propagation characteristic analysis process.

At operation 640, the arithmetic device may perform the ray tracing simulation based on the information acquired at operations 620 and 635. The ray tracing simulation may be performed based on the information acquired as above under the assumption that the signals are transmitted from multiple candidate transmitter positions on the 3D map. It may also be possible to perform the simulation based on the transmit power of additionally transmitted radio signals and beam information.

At operation 645, the arithmetic device may acquire the ray tracing simulation result. As a consequence, the arithmetic device may acquire information related to the propagation paths of the signal when the signal is received at a certain position on the 3D map. It may also be possible to determine the best position of at least one of the transmitter and the receiver for providing radio communication services in a certain area on the map based on the simulation result. It may also be possible to perform network planning effectively by determining the best position of at least one of the transmitter and the receiver. That is, it may be possible to determine the best position of a base station for providing terminals with the radio communication service effectively in a certain area. By determining the best positions of base stations, it may become possible to provide terminals with the communication services effectively with the installation of as small a number of base stations as possible.

At operation 650, the arithmetic device may perform a radio transmission/reception test at a real location marked on the 3D map to acquire actual measurement data. The actual measurement data may be acquired based on information on the signal which is transmitted from a position of a transmitter and received at a position of a receiver in the simulation.

At operation 655, the arithmetic device compares the information acquired at operation 645 and the information acquired at operation 650. If the actual measurement data differs from the simulation result, the arithmetic device may update a physical quantity applied to the radio signal or modify the information on the surface material and contours. Then, the arithmetic device may perform the ray tracing simulation again by reflecting the comparison result.

It may be possible to acquire a more accurate simulation result by performing the simulation with the information acquired at operation 610. It may also be possible to reduce the computation amount for simulation by reflecting the characteristic information categorized in the lookup table at operation 635. It may also be possible to acquire a simulation result similar to the actual measurement result by comparing the actual measurement data and the simulation result at operation 655. According to an embodiment of the present disclosure, an RF quantity amount of "a" is used to acquire the result value and, if the difference between a and the actual measurement value is equal to or greater than "b", the arithmetic device may perform the simulation again by updating the RF quantity amount using the equation $a'=a+\alpha*b$.

Figure 7:
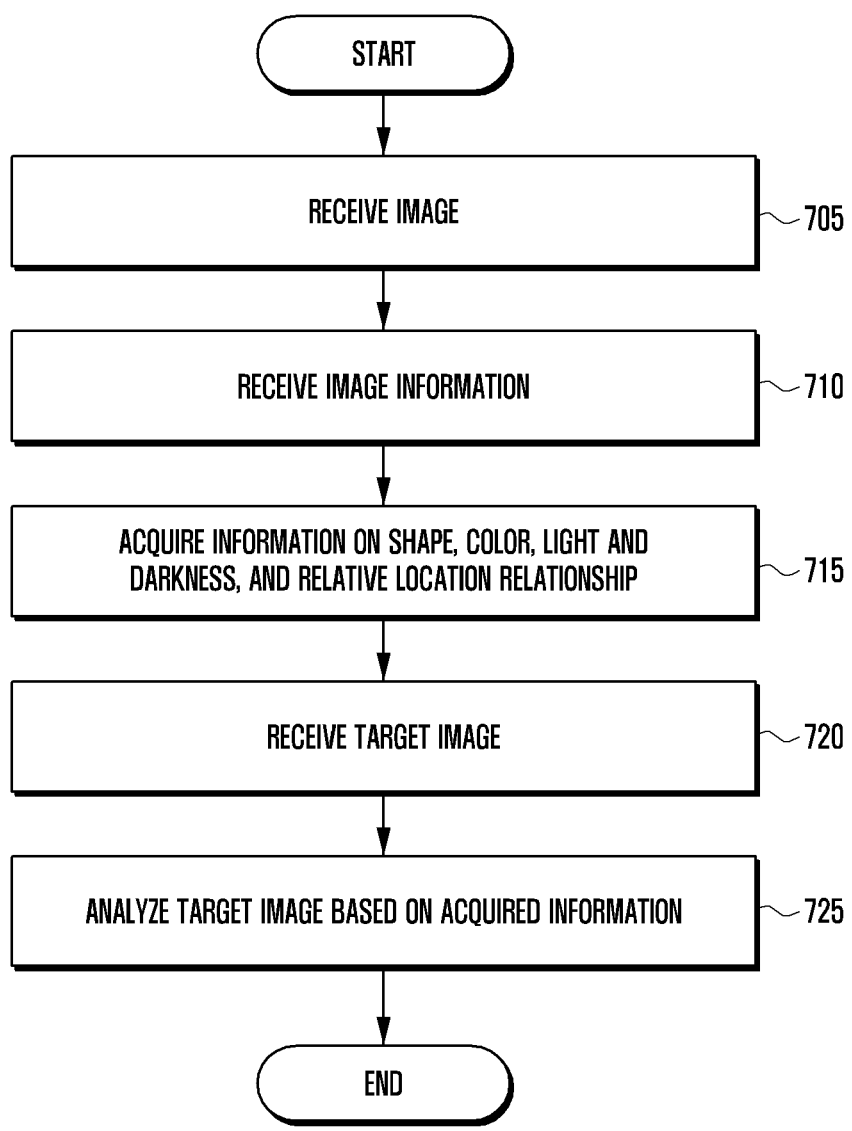
FIG. 7 is a flowchart illustrating a method for acquiring material information of an object in an image according to an embodiment of the present disclosure.

FIG. 7 is a flowchart illustrating a method for acquiring material information of an object in an image according to an embodiment of the present disclosure.

Referring to FIG. 7, an arithmetic device may perform learning of at least one image and analyze the at least one image based on the learned features.

The arithmetic device may receive at least one image at operation 705 and information on the at least one image at operation 710. The image information may include features of the corresponding image. In detail, the image information may include information on the objects appearing in the image, and the arithmetic device may receive various types of images and image information related to the images. According to an embodiment of the present disclosure, the arithmetic device may receive information on image including various types of concrete buildings for image learning on concrete buildings. The arithmetic device may also receive the information on multiple objects included in one image.

At operation 715, the arithmetic device may acquire the information on the shapes, colors, and relative location relationship of the objects included in the input image, perform image learning based on the acquired information, extract information on the objects to acquire common features, and analyze a target image input afterward based on the object information. In detail, the arithmetic device may receive a plurality of reference images, analogize pixels and relations among the neighboring pixels in the reference images through a deep learning technique, and perform a post-processing on the analysis result to acquire information for use in predicting the material of an object defined by certain pixels in an image input afterward.

At operation 720, the arithmetic device receives an image as a target of analysis. According to an embodiment of the present disclosure, the analysis target image may be a 2D image corresponding to the 3D map.

At operation 725, the arithmetic device may analyze the target image based on the information acquired at operation 15. In detail, the arithmetic device may detect a shape of an object in the target image and determine the surface material and contours of the shape.

Figure 8A:
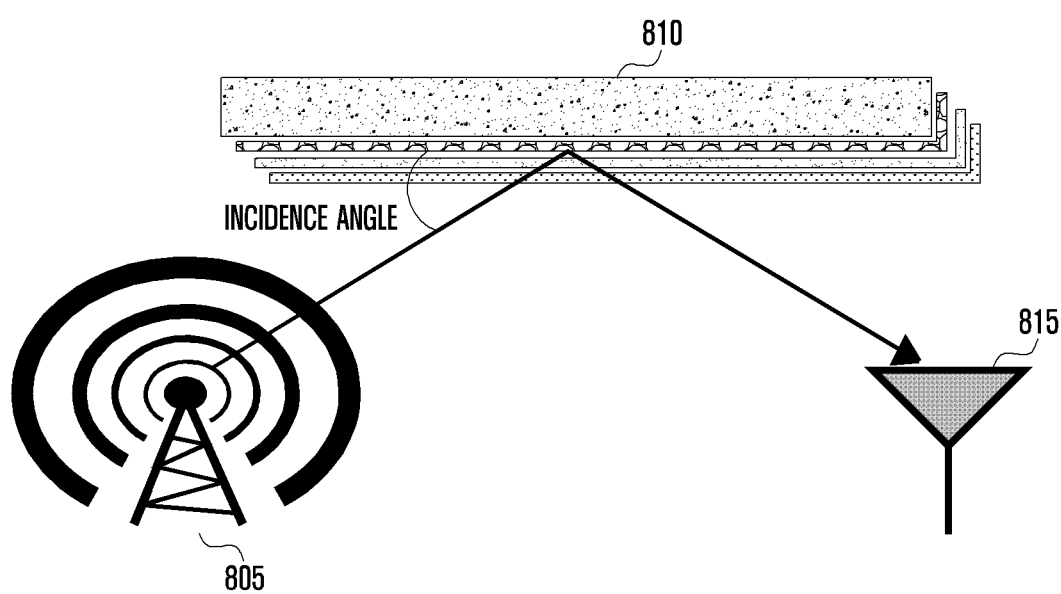
FIGS. 8A, 8B, and 8C are diagrams for explaining a method for analyzing a propagation characteristic of a signal in consideration of a material of an object on a propagation path of the signal according to various embodiments of the present disclosure.
Figure 8B:
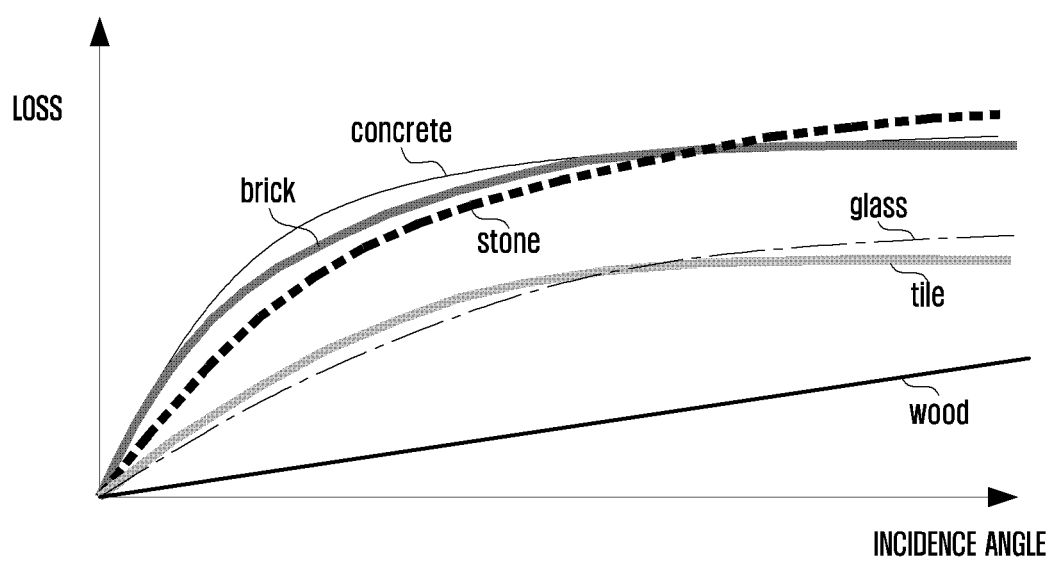
Figure 8C:
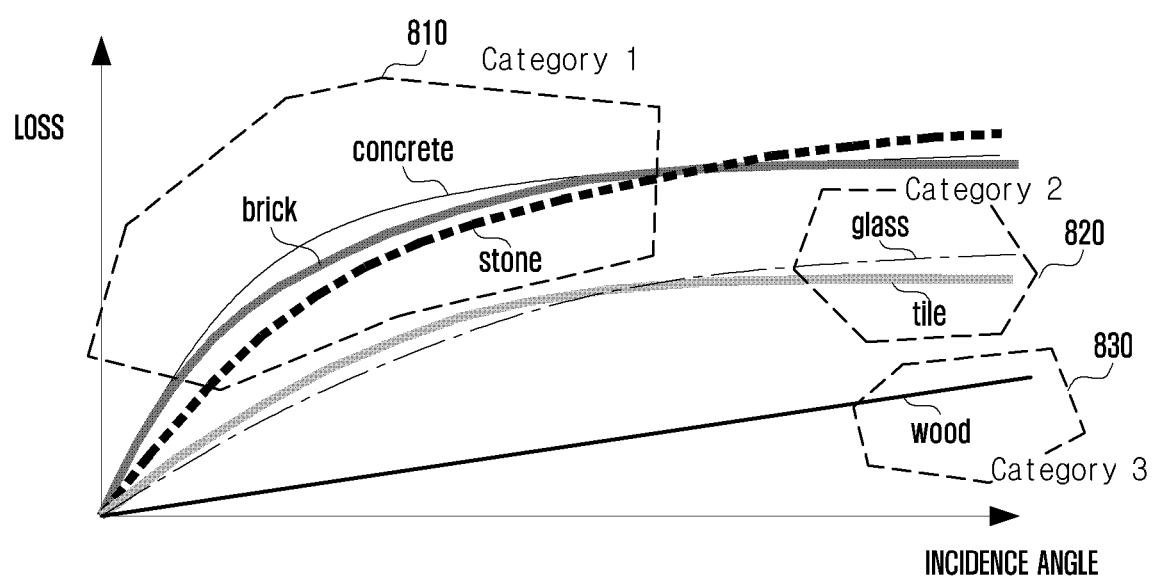

FIGS. 8A, 8B, and 8C are diagrams for explaining a method for analyzing propagation characteristic of a signal in consideration of material of an object on a propagation path of the signal according to an embodiment of the present disclosure.

Referring to FIGS. 8A, 8B, and 8C, a signal transmitted by a transmitter 805 may be reflected on an object 810 and then received by a receiver 815. The signal may be incident on the surface of the object 810 at an incidence angle and attenuated differently according to the surface material of the object 810 and the incidence angle. FIG. 8B is a graph illustrating change of signal loss according to the surface material of the object and incidence angle of the signal. Examples of the material may include brick, concrete, stone, glass, tile, wood, and steel. When the signal is reflected on each surface material, the signal loss rate may vary depending on the incidence angle. For example, the signal loss rate increases as the incidence angle becomes wider.

According to an embodiment of the present disclosure, some surface materials may have similar reflection characteristics. For example, brick, concrete, and stone may have similar reflection characteristics, and glass and tile may have similar reflection characteristics.

Referring to FIG. 8C, it may be possible to group the materials with similar reflection characteristics into the same categories as denoted by reference numbers 810, 820, and 830. Although it is possible to reflect the material-specific characteristic in a simulation, it is preferable to perform the simulation by reflecting category-specific characteristic to reduce the computation amount. The reflection characteristic of a category may be determined by the average value of the characteristics of the materials included in the same category. It may be possible to apply different weights on characteristics of the materials in averaging according to the frequency of appearance in a certain area (the higher the weight, the more frequently the material appears) to determine the reflection characteristic of the corresponding category.

According to an embodiment of the present disclosure, the reflection characteristic may be expressed using a parameter such as permittivity, transmittivity, diffraction coefficient, and reflectivity, and the category-specific reflection characteristic may be determined as in Table 1.

TABLE 1

| Items | Permittivity | Transmittivity | Diffraction coefficient | ... |
|---|---|---|---|---|
| Category 1 | 7 | 0.8 | 0 | |
| Category 2 | 11 | 0.62 | 0.5 | |
| Category 3 | 25 | 0.52 | 1 | |
| Category 4 | ... | ... | ... | |

By grouping the materials in consideration of their reflection characteristics, it is possible to improve the accuracy of a simulation result and reduce the computation amount.

Figure 9A:
FIGS. 9A, 9B, and 9C are diagrams for explaining a method for analyzing a propagation characteristic of a signal in consideration of the contours of an object on a propagation path of the signal according to various embodiments of the present disclosure.
Figure 9B:
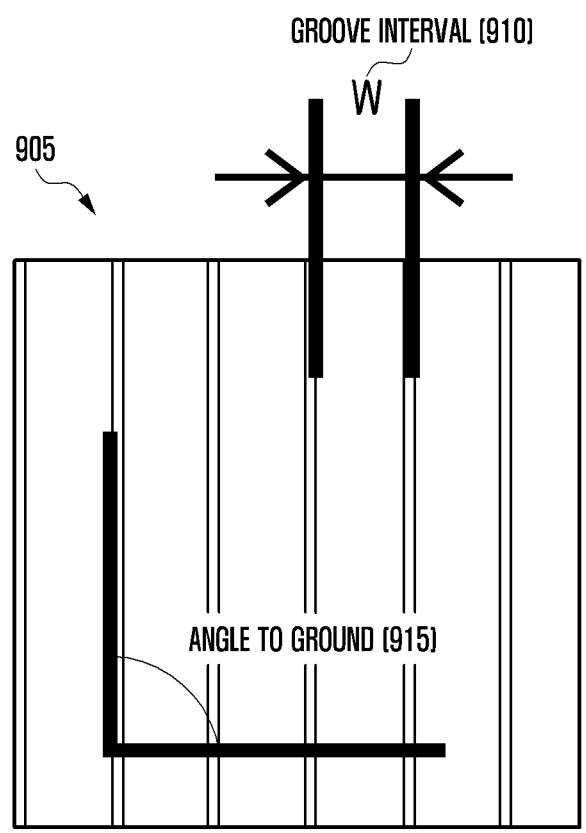
Figure 9C:
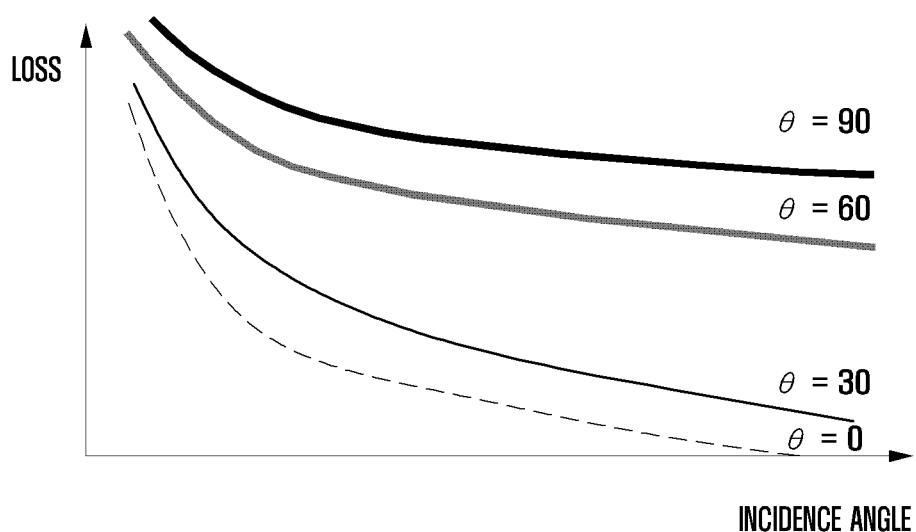

FIGS. 9A, 9B, and 9C are diagrams for explaining a method for analyzing propagation characteristics of a signal in consideration of the contours of an object on a propagation path of the signal according to an embodiment of the present disclosure.

Referring to FIGS. 9A, 9B, and 9C, it may be possible to analyze the propagation characteristic of a radio wave based on the contours of an object identified in a 2D image. In detail, the arithmetic device may determine the contours of the object with a certain pattern when identifying the object in the 2D image. According to an embodiment of the present disclosure, the object may have a surface with a pattern repetitively appearing thereon.

Referring to FIG. 9A, the object may have a part with a pattern characterized by vertical grooves arranged horizontally at a regular interval as denoted by reference number 905. The arithmetic device may identify the object with a pattern such as that in the 2D image based on change in shade and color.

Referring to FIG. 9B, the part 905 with the vertical groove pattern is characterized in that the interval 910 between two consecutive vertical grooves is w and the angle between the vertical grooves and the ground is 90 degrees. The arithmetic device may collect the information on the pattern and analyze the reflection characteristic of the radio wave based on the angle between the vertical grooves and the ground and the interval between the vertical grooves as shown in FIG. 9C. If the angle between the vertical grooves and the ground is 90 degrees, the incidence angle of the radio wave causes the largest signal loss. The arithmetic device may determine the reflection characteristic of the radio wave in consideration of the angle between the vertical grooves and the ground and the interval between the vertical grooves and determine the propagation characteristic of the radio wave more accurately by reflecting the reflection characteristic in a simulation.

Figure 10:
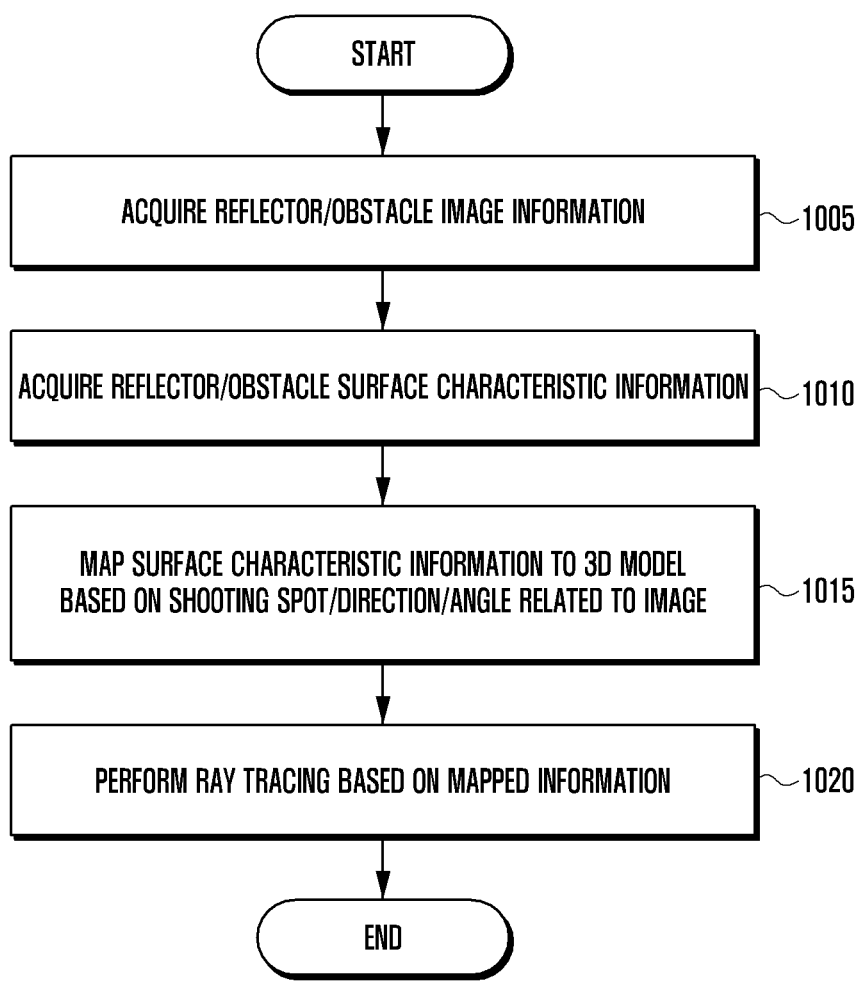
FIG. 10 is a flowchart illustrating a method for performing ray tracing by mapping surface materials and contours of objects to a 3D map according to an embodiment of the present disclosure.

FIG. 10 is a flowchart illustrating a method for performing ray tracing by mapping surface materials and contours of objects to a 3D map according to an embodiment of the present disclosure.

Referring to FIG. 10, an arithmetic device may acquire at operation 1005 information on an object placed on a communication path based on a 2D image for simulation. The object may be a reflector or an obstacle. The term "reflector" is intended to include objects blocking penetration of a radio wave and reflecting the radio wave, and the term "obstacle" is intended to include objects allowing penetration of the radio wave but attenuating the radio wave to some extent by partly absorbing and reflecting the radio wave.

The arithmetic device may acquire surface characteristic information of the object at operation 1010. The surface characteristic information may include a surface material and contours. The contours may include a detailed shape of the object. The arithmetic device may acquire the surface characteristic information of the object through the above-described image analysis.

The arithmetic device may, at operation 1015, map the surface characteristic information to a 3D map model based on the supplementary information of the image. The supplementary information may include at least one of a shooting spot, a shooting direction, a shooting angle, and a focal distance of the 2D image. The arithmetic device may determine the surface characteristic of the object in the 3D map model by mapping the surface information to the object.

The arithmetic device may perform ray tracing at operation 1020 based on the mapped information. The arithmetic device performs the ray tracing to determine a position of at least one candidate transmitter and analyze potential propagation paths from the candidate transmitter's position to a position of a candidate receiver and signal attenuation on the propagation paths. According to an embodiment of the present disclosure, the arithmetic device may determine the communication channel characteristic in the 3D map model environment through the ray tracing simulation.

According to an embodiment of the present disclosure, the signal transmission/reception environment information acquired through the ray tracing simulation may be used for signal transmission of the transmitter after determining the position of the transmitter based on the ray tracing. In detail, the transmitter may transmit a signal based on the ray tracing simulation result and perform beam selection, beam arrangement, and beam modification based on the simulation result according to an embodiment of the present disclosure. By transmitting signals based on the ray tracing simulation information, it may be possible to acquire a more accurate simulation result and information for use in high frequency signal transmission/reception.

Figure 11A:
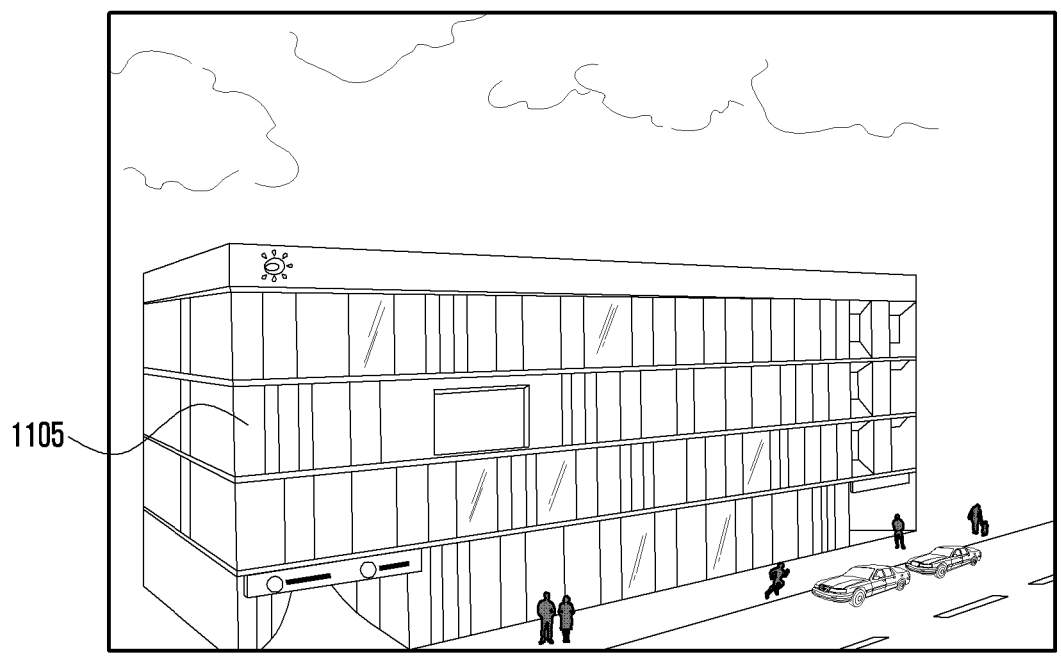
FIGS. 11A, 11B, and 11C are diagrams for explaining a method for determining a material of an object in a two-dimensional (2D) image and mapping material information to a 3D map according to an embodiment of the present disclosure.
Figure 11B:
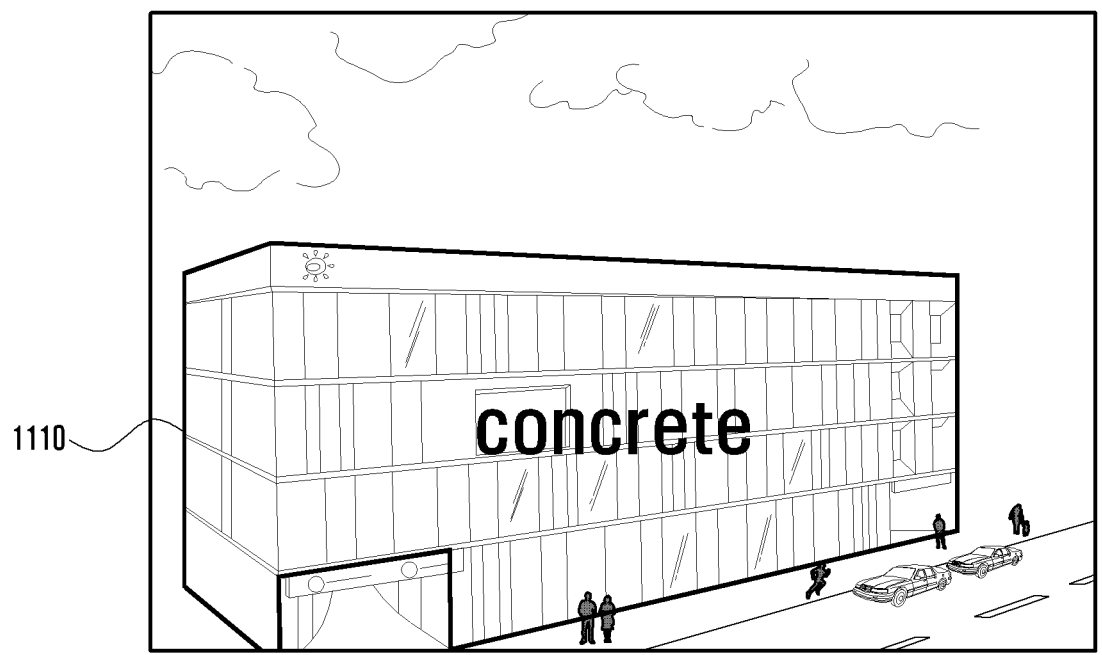
Figure 11C:
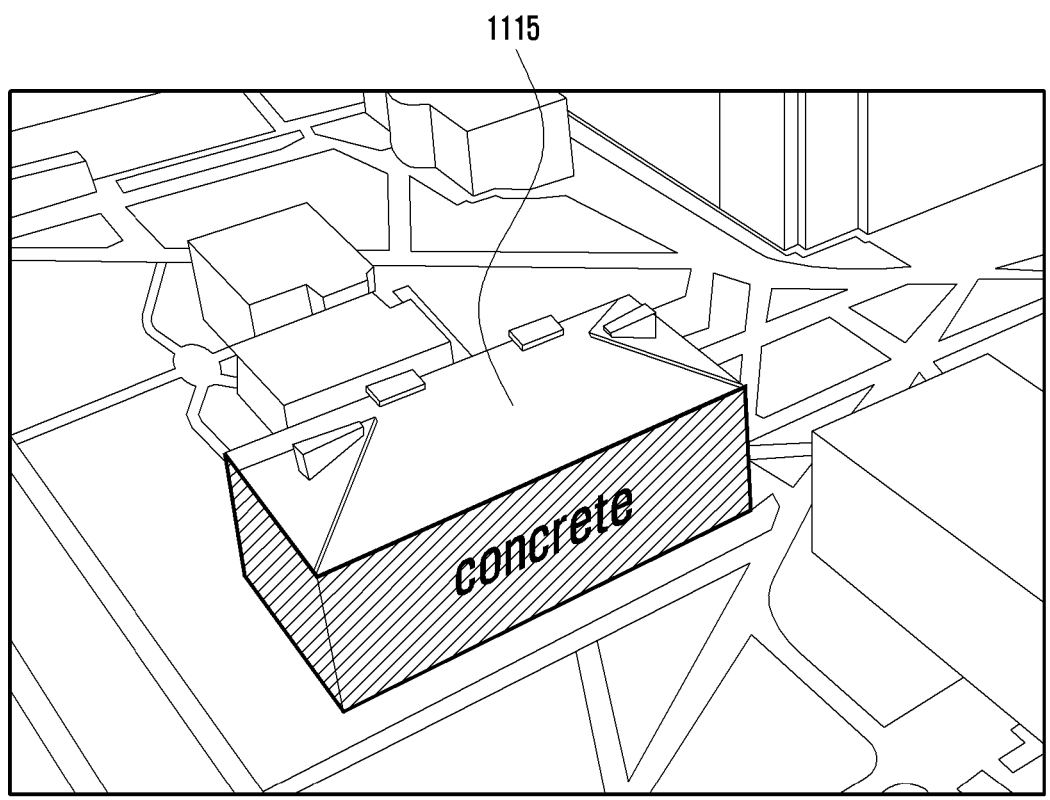

FIGS. 11A, 11B, and 11C are diagrams for explaining a method for determining a material of an object in an 2D image and mapping material information to a 3D map according to an embodiment of the present disclosure.

Referring to FIGS. 11A, 11B, and 11C, the arithmetic device may identify the material of a certain object in a 2D image and map the material information to a 3D map.

In detail, the arithmetic device may receive a 2D image as shown in FIG. 11A. The arithmetic device may identify a building 1105 by analyzing the 2D image. According to an embodiment of the present disclosure, the image analysis may be performed based on a learning result acquired through deep learning. In detail, the arithmetic device may identify boundaries in the image and analyze the boundaries to identify the building 1105.

The arithmetic device may analyze the building 1105 in the 2D image to identify a surface material of the building 1105. The surface material identification may also be performed based on a learning result acquired through deep learning. According to an embodiment of the present disclosure, the arithmetic device may identify that the surface material of the building 1105 is concrete as denoted by reference number 1110 in FIG. 11B.

The arithmetic device may map the surface material information to the 3D map based on the image analysis result and supplementary image information. In detail, the arithmetic device may render a 3D building 1115 in the 3D map model corresponding to the building identified in the 2D image based on the shooting spot, shooting direction, and shooting angle information and map concrete as the surface material to the 3D building 1115. According to an embodiment of the present disclosure, the ray tracing simulation may be performed later based on the mapping result.

Figure 12:
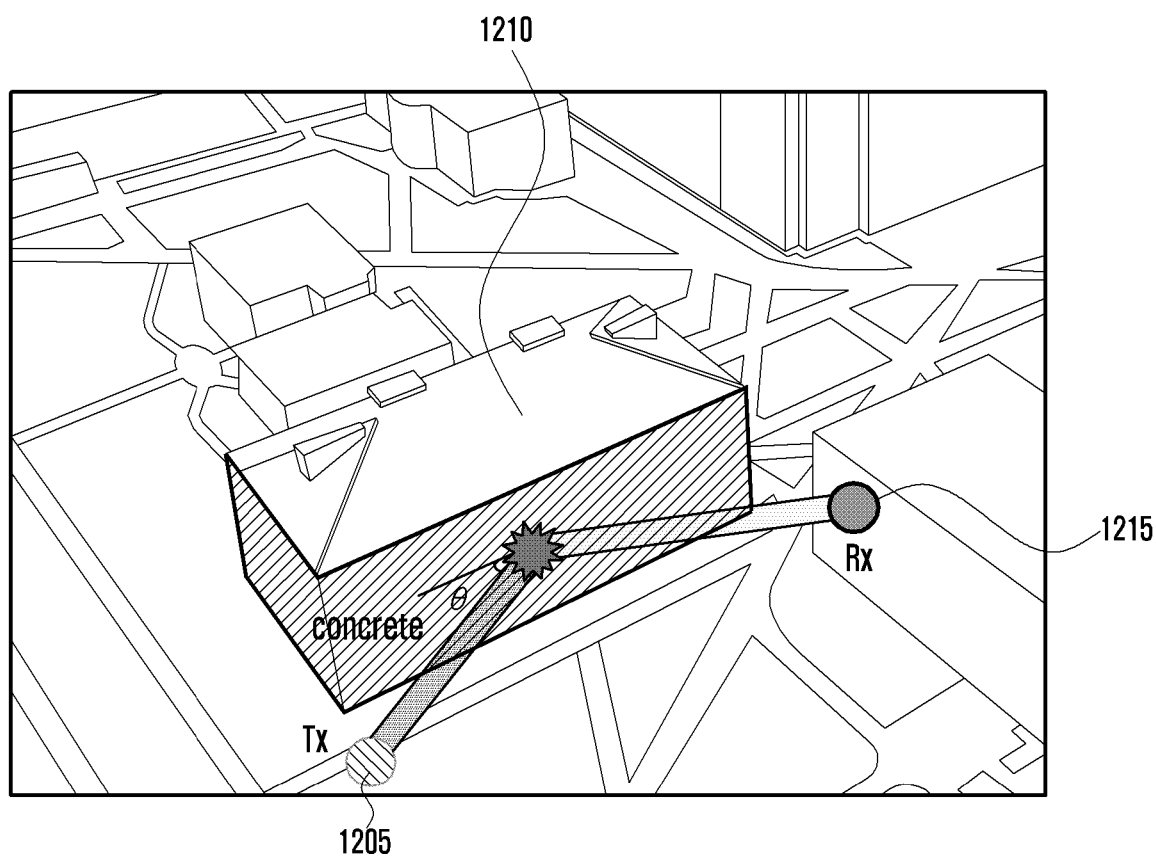
FIG. 12 is a diagram for explaining a method for performing a ray tracing simulation based on material information mapped to a 3D map according to an embodiment of the present disclosure.

FIG. 12 is a diagram for explaining a method for performing a ray tracing simulation based on material information mapped to a 3D map according to an embodiment of the present disclosure.

Referring to FIG. 12, a signal may be transmitted from a Tx position 1205 to an Rx position 1215, and the arithmetic device may simulate the propagation paths of the signal transmitted from the Tx position 1205 to the Rx position 1215 by means of ray tracing simulation. It may be possible to consider a propagation path on which the signal transmitted from the Tx position 1205 is reflected on a building 1210 and then received at the Rx position 1215. Concrete, as the surface material of the building in the 2D image, is mapped to the building 1210 in the 3D map model of FIG. 12. According to an embodiment of the present disclosure, it may be possible to acquire signal propagation information by applying the contour information of the building 1210. At this time, it may be possible to simulate the signal propagation characteristic based on the surface material and incidence angle information of the building 1210. According to an embodiment of the present disclosure, the arithmetic device may perform the simulation by applying the information on the category of the surface material.

Figure 13:
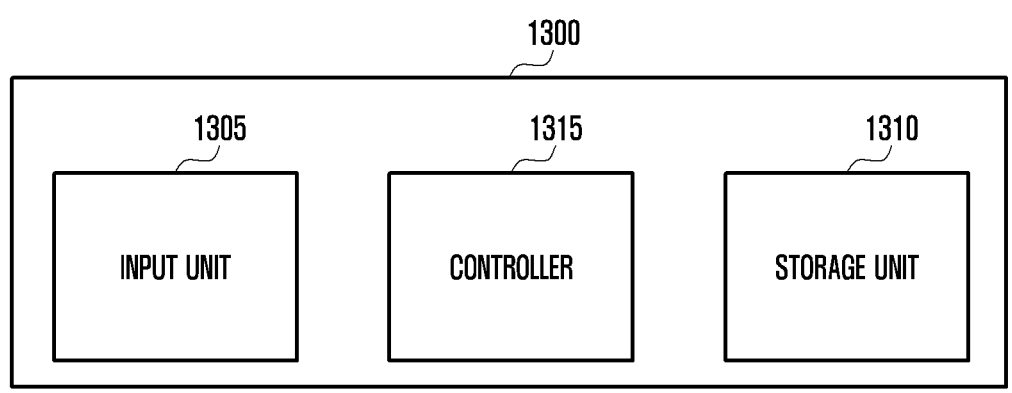
FIG. 13 is a block diagram illustrating a configuration of an arithmetic device according to an embodiment of the present disclosure.

FIG. 13 is a block diagram illustrating a configuration of an arithmetic device according to an embodiment of the present disclosure.

FIG. 13 depicts the arithmetic device according to an embodiment of the present disclosure.

Referring to FIG. 13, the arithmetic device 1300 includes an input unit 1305 (e.g., an input device), a storage unit 1310 (e.g., a memory), and a controller 1315 (e.g., at least one processor).

The input unit 1305 may communicate signals with a device outside the arithmetic device 1300. In detail, the input unit 1305 may communicate data with an external device and include an interface for data communication.

The storage unit 1310 may store at least one of information on the arithmetic device 1300 and information transmitted/received through the input unit 1305. The storage unit 1310 may also store the simulation result information, object surface material and contour information acquired through image analysis, 3D map, and information on the object surface material and contours mapped to the 3D map for use in a simulation according to an embodiment of the present disclosure. It may be possible to add, delete, and update information stored in the storage unit 1310 based on at least one of a simulation result and comparison result.

The controller 1315 may control the arithmetic device 1300 to perform the overall operation described in the above various embodiments. The controller 1315 may include at least one processor. The processor may be controlled by a program including instructions being executed for implementing the method described in the above an embodiment. The program may be stored in a storage medium, which may be a volatile or non-volatile memory. The memory may be a medium capable of storing data, and the instructions may be stored in the memory in, but not limited to, a certain format.

As described above the ray tracing simulation-based communication channel environment analysis method and apparatus of the present disclosure is advantageous in terms of locating a Tx position efficiently by improving ray tracing simulation accuracy in RF channel environment analysis-based network planning.

Also, the ray tracing simulation-based communication channel environment analysis method and apparatus of the present disclosure is advantageous in terms of reducing a computation amount of a ray tracing simulation.

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a device for a wireless communication system, the method comprising:
obtaining, by a processor of the device, data associated with a material of an object in an area, wherein the data includes signal characteristic information of a category including the material;
processing, by the processor, a simulation for the area by identifying the category corresponding to the material of the object in the area and applying a transmission characteristic value of the identified category of the material to the object based on the data associated with the material; and
displaying, by the processor, a result of the simulation.

2. The method of claim 1,
wherein the signal characteristic information is determined based on a contour of the object, and
wherein the contour includes a pattern with a groove appearing on a surface of the object.

3. The method of claim 1, further comprising:
identifying the object from an image for the area;
identifying the material of the object; and
mapping the object and the material to a 3-dimensional map for the area based on at least one of a shooting location, a direction, or an angle of the image.

4. The method of claim 3, wherein the identifying the material of the object further comprises:
identifying, by the processor of the device, the material based on the image and learned information related to the image,
wherein the learned information is acquired, by the processor of the device, using deep learning-based computer vision technology.

5. The method of claim 3, wherein the identifying of the material of the object further comprises:
identifying at least one element from the image based on at least one of a color, a light and darkness, a reflectivity, a relative location relationship, or an arrangement of elements, and
identifying a material of each of the at least one element based on an analyzing result for a plurality of images stored in a memory.

6. The method of claim 1,
wherein the signal characteristic information is determined based on an incidence angle of a signal to the object and attenuation information of the signal, and
wherein the signal characteristic information comprises at least one of a permittivity, a transmittivity, a diffraction coefficient, or a reflexibility of the material.

7. The method of claim 1,
wherein at least one material having a reflection characteristic difference less than a threshold is included in the category, and
wherein the signal characteristic information of the category is determined by an average value of characteristics of the at least one material included in the category.

8. The method of claim 7,
wherein the average value is determined by applying different weights to the characteristics of the at least one material included in the category, and
wherein a higher weight is applied to a material appearing more frequently in the area.

9. The method of claim 1,
wherein the processing of the simulation for the area further comprises identifying a location of a transmission position and a location of a reception position for the simulation, and
wherein the simulation is processed for a transmission path of a signal from the transmission position to the reception position.

10. The method of claim 1, further comprising:
obtaining data associated with a shape of the object in the area,
wherein the simulation is processed by using the data associated with the material and the data associated with the shape.

11. A device for a wireless communication system, the device comprising;
a memory; and
at least one processor configured to:
obtain data associated with a material of an object in an area, wherein the data includes a signal characteristic information of a category including the material,
process a simulation for the area by identifying the category corresponding to the material of the object in the area and applying a transmission characteristic value of the identified category of the material to the object based on the data associated with the material, and
display a result of the simulation.

12. The device of claim 11,
wherein the signal characteristic information is determined based on a contour of the object, and
wherein the contour includes a pattern with a groove appearing on a surface of the object.

13. The device of claim 11, wherein the at least one processor is further configured to:
identify the object from an image for the area,
identify the material of the object, and
map the object and the material to a 3-dimensional map for the area based on at least one of a shooting location, a direction, or an angle of the image.

14. The device of claim 13,
wherein the at least one processor is further configured to:
identify the material based on the image and learned information related to the image, and
wherein the learned information is acquired using deep learning-based computer vision technology.

15. The device of claim 13, wherein the at least one processor is further configured to:
identify at least one element from the image based on at least one of a color, a light and darkness, a reflectivity, a relative location relationship, or an arrangement of elements, and
identify a material of each of the at least one element based on an analyzing result for a plurality of images stored in the memory.

16. The device of claim 11,
wherein the signal characteristic information is determined based on an incidence angle of a signal to the object and attenuation information of the signal, and
wherein the signal characteristic information comprises at least one of a permittivity, a transmittivity, a diffraction coefficient, or a reflexibility of the material.

17. The device of claim 11,
wherein at least one material having a reflection characteristic difference less than a threshold is included in the category, and
wherein the signal characteristic information of the category is determined by an average value of characteristics of the at least one material included in the category.

18. The device of claim 17,
wherein the average value is determined by applying different weights to the characteristics of the at least one material included in the category, and
wherein a higher weight is applied to a material appearing more frequently in the area.

19. The device of claim 11,
wherein the at least one processor is further configured to identify a location of a transmission position and a location of a reception position for the simulation, and
wherein the simulation is processed for a transmission path of a signal from the transmission position to the reception position.

20. The device of claim 11,
wherein the at least one processor is further configured to obtain data associated with a shape of the object in the area, and
wherein the simulation is processed by using the data associated with the material and the data associated with the shape.

* * * * *